United States Patent
Swaminathan et al.

(10) Patent No.: US 9,307,452 B2
(45) Date of Patent: Apr. 5, 2016

(54) METHOD AND APPARATUS FOR DECREASING LTE RE-ACQUISITION DELAY IN S102-LESS CSFB

(71) Applicant: QUALCOMM Incorporated, San Diego, CA (US)

(72) Inventors: Arvind Swaminathan, San Diego, CA (US); Srinivasan Balasubramanian, San Diego, CA (US); Kurt Otte, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 13/689,664

(22) Filed: Nov. 29, 2012

(65) Prior Publication Data
US 2014/0146784 A1    May 29, 2014

(51) Int. Cl.
*H04W 36/00* (2009.01)
*H04W 48/18* (2009.01)
*H04W 76/02* (2009.01)
*H04W 88/06* (2009.01)

(52) U.S. Cl.
CPC .............. *H04W 36/00* (2013.01); *H04W 48/18* (2013.01); *H04W 76/026* (2013.01); *H04W 88/06* (2013.01)

(58) Field of Classification Search
CPC ....................................................... H04W 36/00
USPC ................................................. 370/331, 328
See application file for complete search history.

(56) References Cited

U.S. PATENT DOCUMENTS

| | | | |
|---|---|---|---|
| 2010/0240370 A1* | 9/2010 | Pandit et al. | 455/436 |
| 2010/0284333 A1* | 11/2010 | Shirota et al. | 370/328 |
| 2010/0291941 A1* | 11/2010 | Chen et al. | 455/450 |
| 2011/0141939 A1* | 6/2011 | Medapalli | 370/252 |
| 2011/0149908 A1 | 6/2011 | Olsson et al. | |
| 2011/0188468 A1 | 8/2011 | Vikberg et al. | |
| 2011/0222509 A1 | 9/2011 | Lee | |
| 2012/0052885 A1 | 3/2012 | Zhang et al. | |
| 2012/0270545 A1* | 10/2012 | Zhao et al. | 455/435.1 |

FOREIGN PATENT DOCUMENTS

| | | |
|---|---|---|
| WO | 2010129932 A1 | 11/2010 |
| WO | 2011156264 A2 | 12/2011 |

OTHER PUBLICATIONS

Li Wenyi, Masa Shirota, Jun Wang, Wentao Zhang, Yuanfang Yu, Xia Gongyi, Li Zhiming, LTE-1x eCSFB MT Long SMS procedure, 3rd Generation Partnership Project 2 "3GPP2", 3GPP2 A30-20100913, Oct. 2010.

(Continued)

*Primary Examiner* — Charles C Jiang
*Assistant Examiner* — Thad Defauw
(74) *Attorney, Agent, or Firm* — Arent Fox LLP

(57) ABSTRACT

A method, an apparatus, and a computer program product for wireless communication are provided. The apparatus may be a UE. In one aspect, the UE may establish a context for a first RAT, perform an activity involving at least one transmission via a second RAT without initiating a procedure to suspend the context for the first RAT when a duration of the activity is less than a threshold, and communicate via the first RAT using the context after the activity is performed. In another aspect, the UE may receive one or more signals via at least a first RAT, transmit via a second RAT, and perform at least one cell reselection procedure using the one or more signals during the transmission via the second RAT.

36 Claims, 11 Drawing Sheets

(56) References Cited

OTHER PUBLICATIONS

"3rd Generation Partnership Project; 1-48 Technical Specification Group Services and System Aspects; Circuit Switched (CS) fallback in Evolved Packet System (EPS); Stage 2 (Release 11)", 3GPP Standard; 3GPP TS 23.272, 3rd Generation Partnership Project ( 3GPP), Mobile Competence Centre, 658, Route Des Lucioles . F-86921 Sophia-Antipolis Cedex . France , vol. SA WG2, No. V11.2.8, Sep. 11, 2012 pp. 1-98, XP050649055, [retrieved on 2812-89-11] sections 4.2, 4.3, 5, 6, 8.2, B.2, B.3.

International Search Report and Written Opinion—PCT/US2013/868313—ISA/EPO Apr. 7, 2014.

Taiwan Search Report—TW102141717—TIPO—Jan. 21, 2015.

* cited by examiner

METHOD AND APPARATUS FOR DECREASING LTE RE-ACQUISITION DELAY IN S102-LESS CSFB

BACKGROUND

1. Field

The present disclosure relates generally to communication systems, and more particularly, to a method and apparatus for decreasing LTE re-acquisition delay in S102-less circuit switched fallback (CSFB).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus establishes a context for a first radio access technology (RAT), performs an activity involving at least one transmission via a second RAT without initiating a procedure to suspend the context for the first RAT when a duration of the activity is less than a threshold, and communicates via the first RAT using the context after the activity is performed.

In an aspect of the disclosure, a method, a computer program product, and an apparatus are provided. The apparatus receives one or more signals via at least a first RAT, transmits via a second RAT, and performs at least one cell reselection procedure using the one or more signals during the transmission via the second RAT.

DETAILED DESCRIPTION

Figure 1:
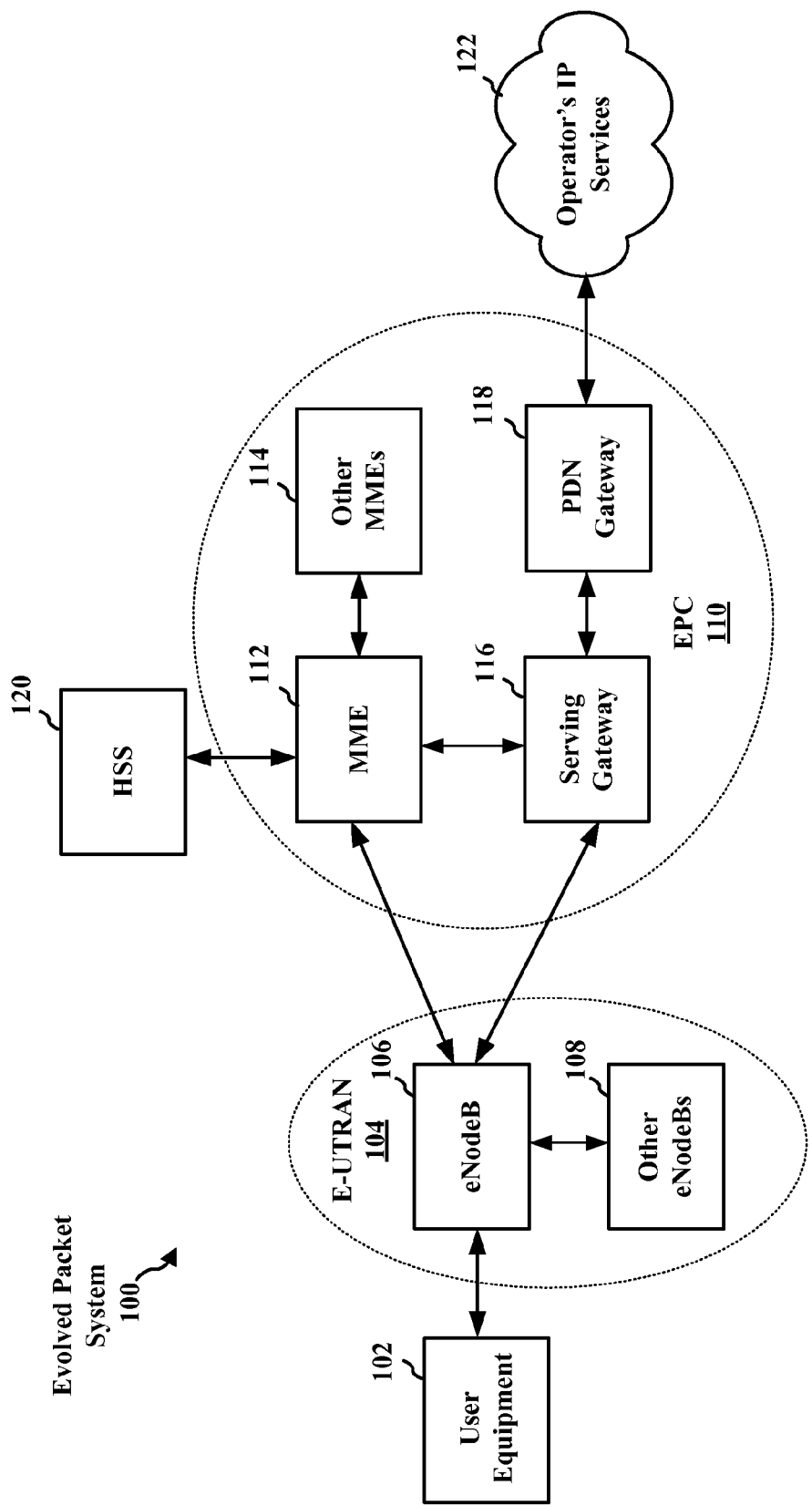
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
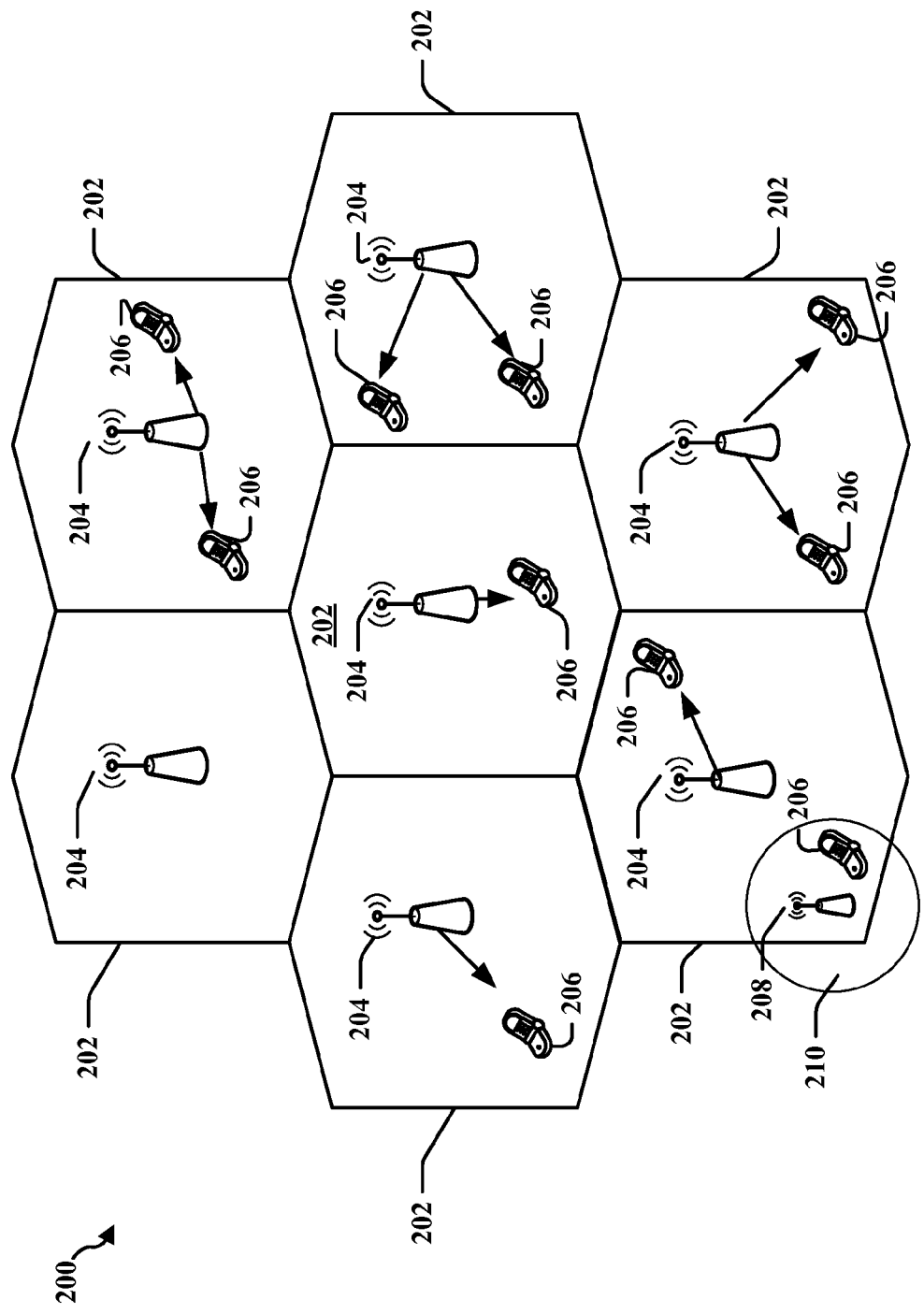
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
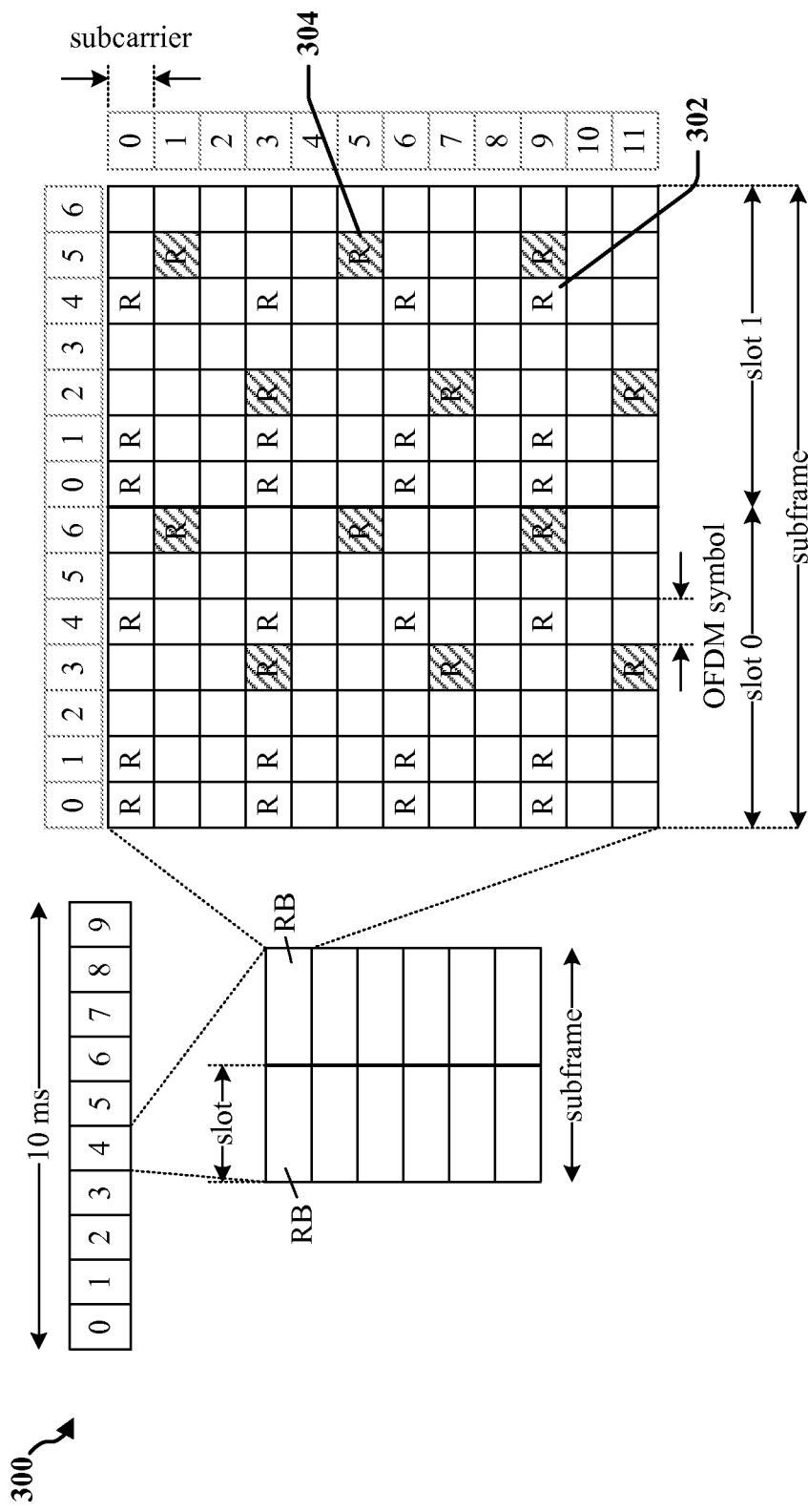
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
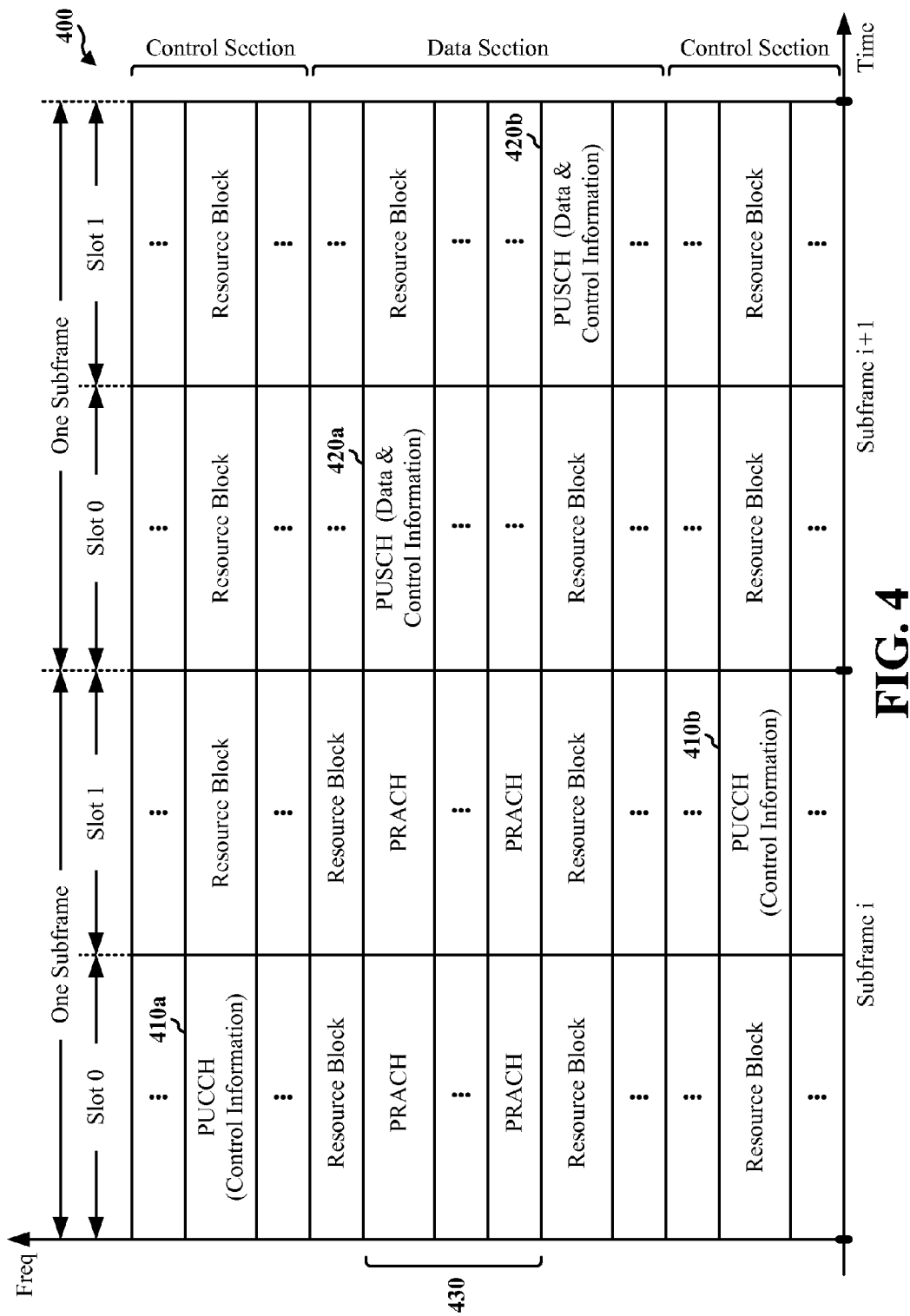
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
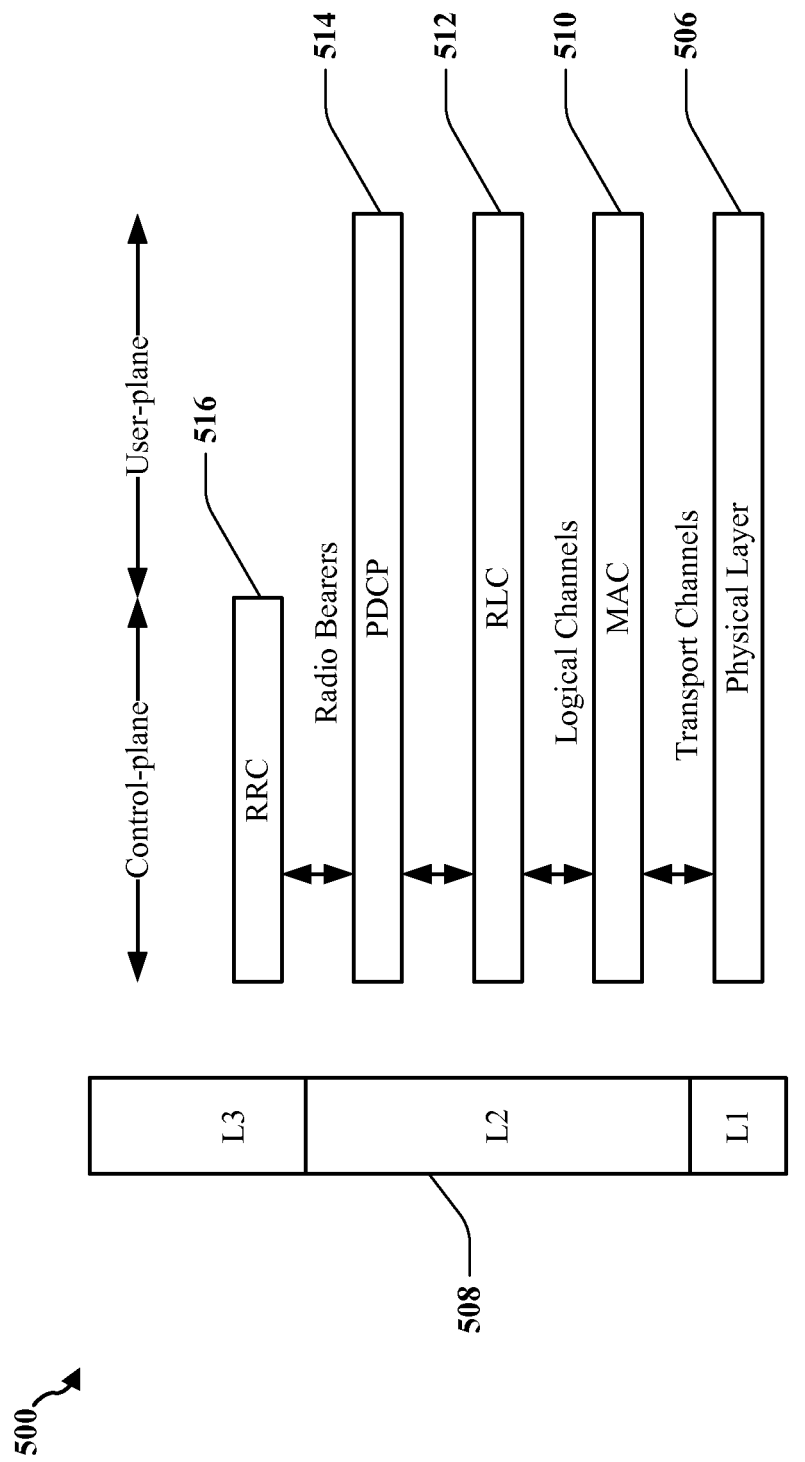
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
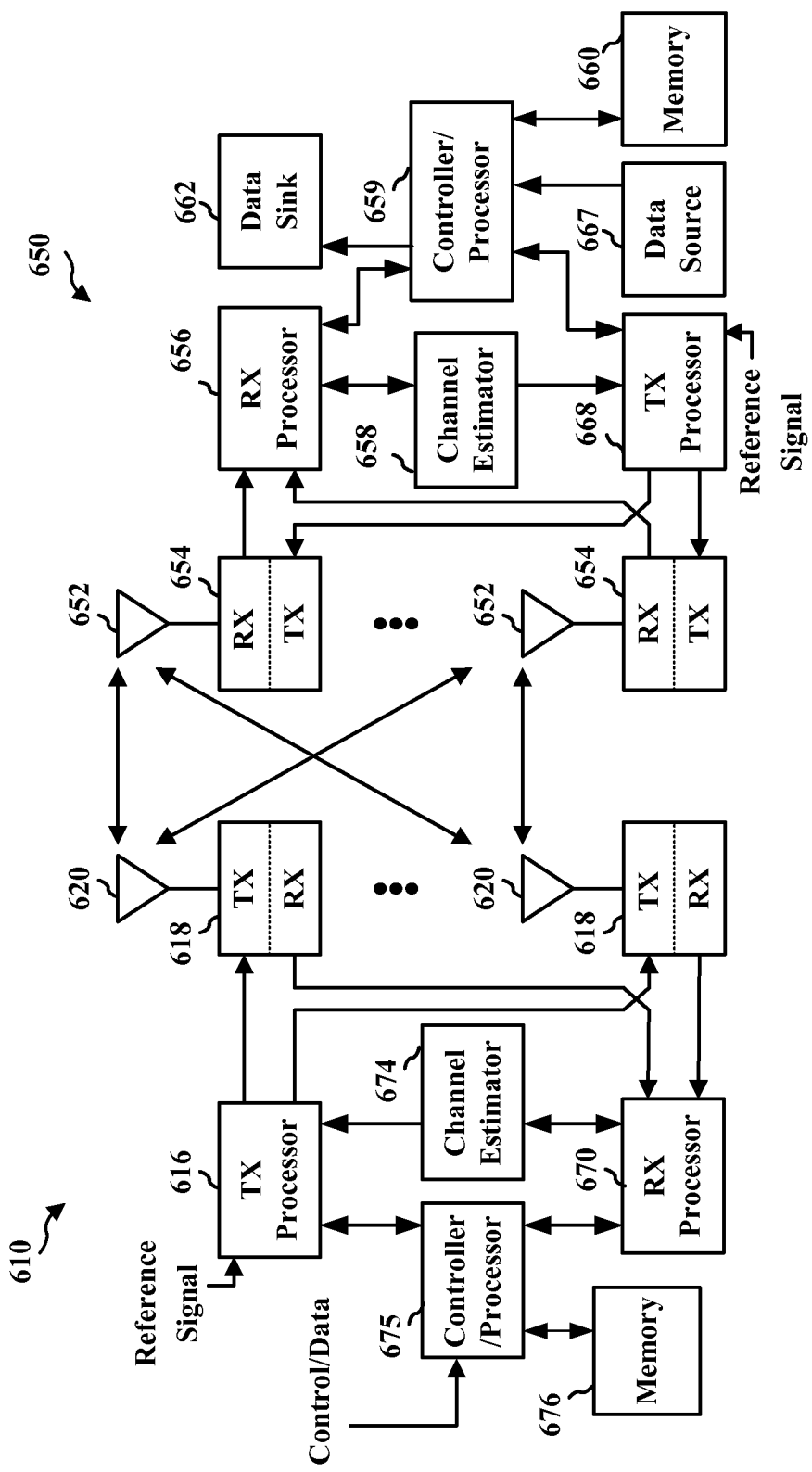
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
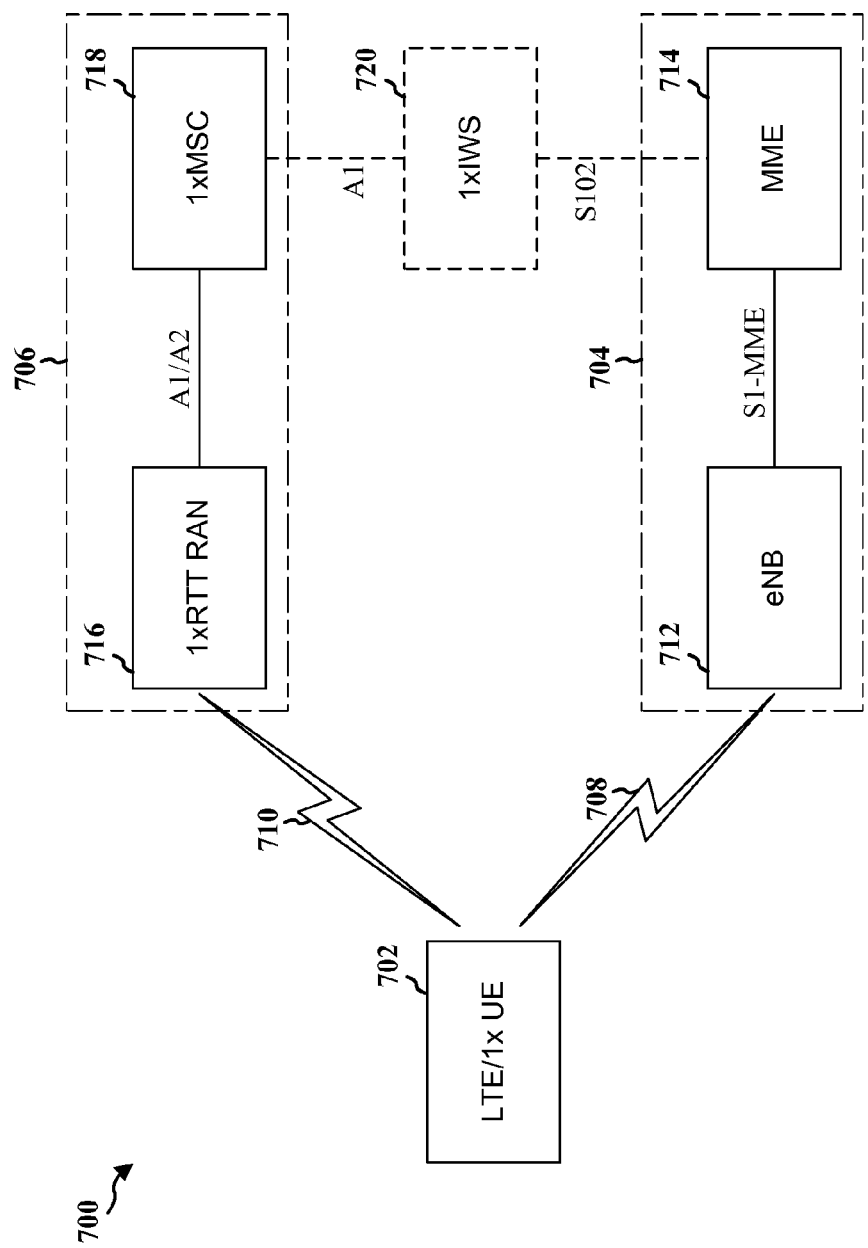
FIG. 7 is a diagram illustrating a UE configured to communicate with a first network and a second network.

FIG. 7 is a diagram 700 illustrating a UE 702 configured to communicate with a first network 704 and a second network 706. For example, the first network 704 may be a packet switched network configured to communicate using a first RAT, such as LTE. The second network 706 may be a network configured to provide circuit switched domain services, such as voice calls, and configured to communicate using a second RAT, such as One Times Radio Transmission Technology (hereinafter referred to as "1×RTT" or "1×"). In the configuration of FIG. 7, the first network 704 may include an eNB 712 and a mobility management entity (MME) 714. For example, the eNB 712 may communicate with the MME 714 via an S1-MME interface. The second network 706 may include a 1×RTT radio access network (RAN) 716 and a 1× mobile switching center (hereinafter referred to as "1×MSC") 718. For example, the 1×RTT RAN 716 may communicate with the 1×MSC 718 via an A1/A2 interface.

The UE 702 may be configured to communicate with the first and second networks 704 and 706 via wireless links 708 and 710, respectively. For example, the wireless link 708 may be established using LTE and the wireless link 710 may be established using 1×RTT. In one aspect, the UE 702 may include a single radio frequency (RF) transmit chain and at least two RF receive chains. In the configuration of FIG. 7, the UE 702 may be camped on both the first and second networks 704 and 706.

As shown in FIG. 7, an optional 1× interworking solution 720 (hereinafter referred to as "1×IWS") may be coupled between the first network 704 and the second network 706. In the configuration of FIG. 7, the 1×MSC 718 may communicate with the 1×IWS 720 via an A1 interface and the MME 714 may communicate with the 1×IWS 720 via an S102 interface. The S102 interface may provide a tunnel between the MME 714 and the 1×IWS 720 for delivering 1× signaling messages to the first network 704.

With reference to FIG. 7, the UE 702 may perform signaling via the wireless links 708 and 710 to register with the first and second networks 704 and 706, respectively. The UE 702 may listen for pages from the first network 704 and the second network 706 when operating in an idle mode. In addition, the UE 702 may listen for pages from the second network 706 when the UE 702 is communicating with the first network 704. For example, if the first RAT used by first network 704 is LTE, the UE 702 may listen for pages from the second network 706 while the UE 702 is on LTE traffic.

The first network 704 may be configured to identify an extended service request (ESR) message received from the UE 702. In one configuration, the first network 704 may be configured to support interpretation of the ESR message. In another configuration, the first network 704 may be configured to support 1× circuit switched fallback (hereinafter referred to as "1×CSFB") via the 1×IWS 720 in response to the ESR message.

When the UE 702 is to perform an activity involving a transmission via the second network 706, the UE 702 may determine whether the duration of the activity is less than a threshold. For example, the activity may be a relatively long activity, such as a mobile-originated (MO) 1×RTT voice call or a response to a mobile-terminated (MT) page with voice service option, or a relatively short activity, such as a registration procedure on the second network 706 or a transmission of a short message service (SMS) message on the second network 706. For example, the threshold may be a period of time, such as 10.0 seconds. In one configuration, the UE 702 may determine the duration of the activity to be performed based on previously received information indicating the approximate duration of the activity or based on a previous performance of the activity.

If the duration of the activity to be performed is not less than the threshold, the UE 702 may initiate a procedure to suspend the context for the first RAT by sending an ESR message to the first network 704 via wireless link 708 prior to performing the activity on the second network 706. In one configuration, the first network 704 may suspend data for the UE 702 in response to the ESR message to enable the UE 702 to resume use of the first network 704 after the activity (e.g., the voice call transmission) is performed. For example, the data may be a packet data protocol (PDP) context established in the first network 704 or other data to be delivered to the UE 702. When the UE 702 ends a call on the second network 706, the UE 702 may send a tracking area update (TAU) to the first network 704 to resume data services on the first network 704.

If the duration of the activity to be performed is less than the threshold, the UE 702 may perform the activity without sending the ESR message to the first network 704. In one configuration, the UE 702 may perform the activity via the second network 706 at the end of a paging cycle of the first network 704 in order to decrease the possibility of missing a page transmitted to the UE 702 from the first network 704. For example, the page may be an LTE page that is transmitted according to an LTE paging cycle. In another configuration, the UE 702 may perform the activity via the second network 706 immediately after the first RAT of the first network 704 enters a low power state. By performing the activity via the second network 706 without sending the ESR message to the first network 704, the UE 702 may decrease the amount of signaling and time for re-acquisition of the first network 704 and resuming activity on the first network 704 after performing the activity via the second network 706.

In one aspect, the UE 702 may decrease delays in resuming communication via the first network 704 after performing an activity via the second network 706. In the configuration of FIG. 7, since the UE 702 includes a single RF transmit chain, the UE 702 may not be able to use its communication protocol stack corresponding to the first network 704 to perform a transmission when the UE 702 is performing an activity involving a transmission to the second network 706. However, since the UE 702 includes at least two RF receive chains, the UE 702 may use its communication protocol stack corresponding to the first network 704 to perform receiving functions. For example, the UE 702 may receive and perform measurements on EV-DO frequencies. As another example, the UE 702 may receive system information update messages and may perform an idle mode cell reselection procedure on the first network 704 while the UE 702 is transmitting to the second network 706. For example, the cell reselection procedure may be an intra-frequency reselection procedure, an inter-frequency reselection procedure, and/or an inter-RAT reselection procedure.

Therefore, by performing the idle mode cell reselection procedure, the UE 702 will be camped on the optimal frequency or RAT when the transmission to the second network 706 is completed. In addition, since the idle mode cell reselection procedure is performed by the UE 702 on the first network 704, the UE 702 will receive the latest copy of all system information block (SIB) overhead messages. If the UE 702 moves to EV-DO through reselection, then the UE 702 may receive the latest EV-DO overhead messages. By camping on the optimal frequency or RAT and receiving the latest copy of all system information block overhead messages, the UE 702 may avoid re-acquisition delays with respect to the first network 704 and, therefore, substantially reduce the time to resume activity on the first network 704 after performing the transmission on the second network 706.

It should be noted that if the communication protocol stack corresponding to the first network 704 is suspended during the transmission to the second network 706, the UE 702 may have to perform time consuming procedures, such as a tracking area update procedure and/or out-of-service (OOS) scans, in order to resume communications via the first network 704. If the UE 702 has moved during the transmission to the second network 706, the time to resume communications via the first network 704 may be relatively large. Moreover, if the UE 702 has moved out of a region covered by the first network 704 and into an EV-DO only region, the time to resume communications via the first network 704 may be significantly larger.

Figure 8:
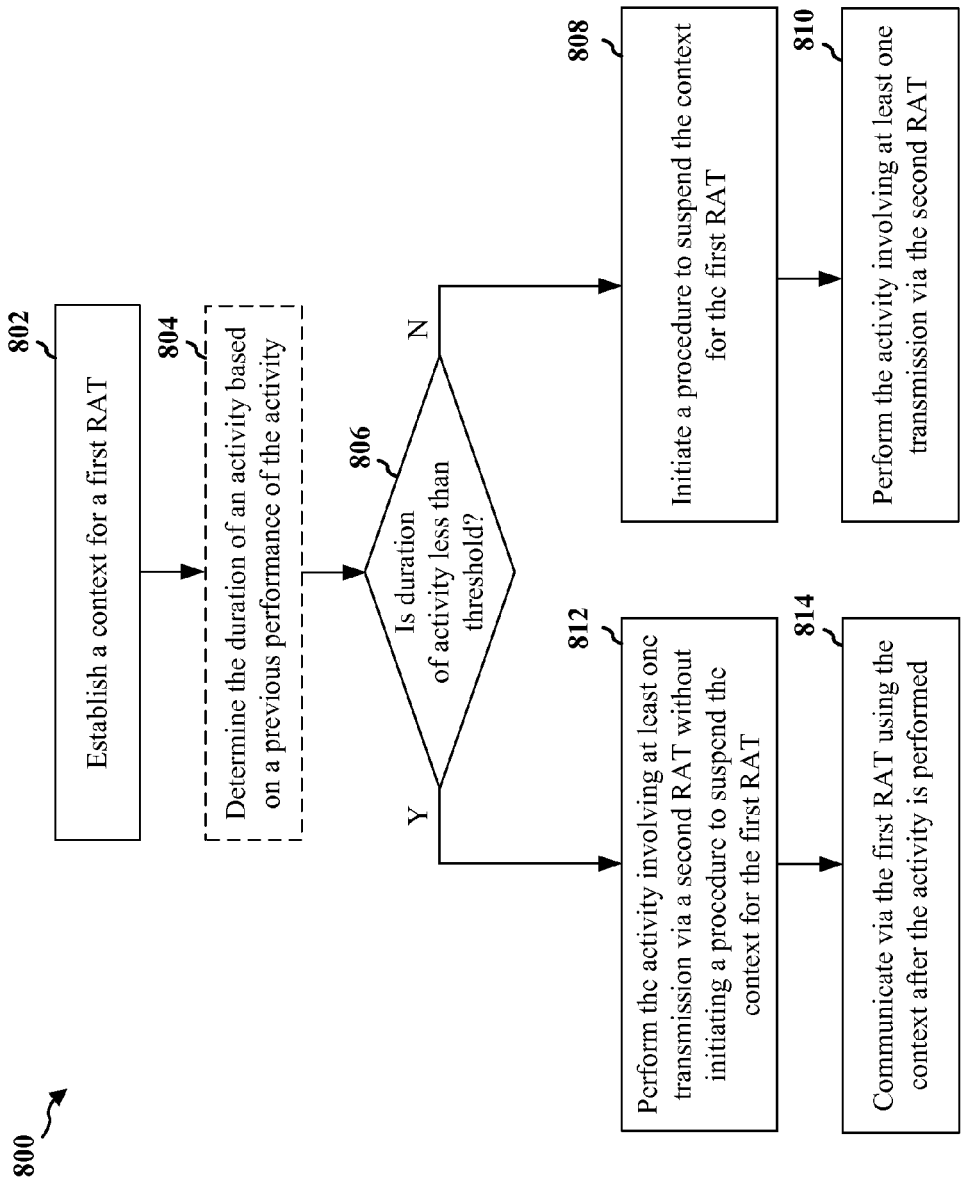
FIG. 8 is a flow chart of a method of wireless communication.

FIG. 8 is a flow chart 800 of a method of wireless communication. The method may be performed by a UE. At step 802, the UE may establish a context for a first RAT of a first network. For example, with reference to FIG. 7, the UE 702 may establish a context for a first RAT, such as LTE, of the first network 704. In one configuration, the context may be setup and stored in the MME 714 of the first network 704. For example, the context may include user subscription information and may further include dynamic information such as the list of bearers that are established and the capabilities of the UE 704.

At step 804, the UE may determine the duration of an activity to be performed, where the activity involves at least one transmission to a second network via a second RAT. In one configuration, the second RAT may be different from the first RAT. For example, with reference to FIG. 7, the second network may be a network configured to provide circuit switched domain services, such as voice calls, and the second RAT may be 1×RTT. For example, the activity may be a 1× registration procedure, an SMS message transmission, an MO 1×RTT voice call, or a response to an MT page with voice service option. In one configuration, the UE may determine the duration of the activity to be performed based on previously received information indicating the approximate duration of the activity. In another configuration, the UE may determine the duration of the activity to be performed based on a previous performance of the activity. For example, with reference to FIG. 7, the UE 702 may perform an activity, such as an SMS message transmission via the second network 706, and measure and store the amount of time required for performing the activity. When the UE 702 is to subsequently perform a similar activity (e.g., an SMS message transmission), the UE 702 may reference the stored amount of time to determine the duration of the activity to be performed.

At step 806, the UE may determine whether the duration of the activity is less than a threshold. For example, the threshold may be a period of time, such as 10.0 seconds.

If the duration of the activity to be performed is not less than the threshold (806), the UE may initiate a procedure to suspend the context for the first RAT at step 808. For example, the UE may send an ESR message to the first network via the first RAT prior to performing the activity on the second network. In one configuration, the first network may suspend data for the UE in response to the ESR message to enable the UE to resume use of the first network after the activity is performed. For example, the data may be a PDP context established in the first network or other data to be delivered to the UE. In one configuration, when the UE ends a call on the second network, the UE may send a TAU to the first network to resume data services. At step 810, the UE may perform the activity involving at least one transmission via the second RAT.

If the duration of the activity to be performed is less than the threshold (806), the UE may perform the activity without sending an ESR message to the first network at step 812. In one configuration, the first network may be configured to suspend the context in response to receiving an ESR message. For example, if the threshold is set to 10.0 seconds and if the activity to be performed is a transmission of an SMS message on the second network 706, the UE 702 may determine that the duration of the activity is 5.0 seconds. Accordingly, since the duration of the activity to be performed is less than the threshold, the UE 702 may proceed to perform the activity without sending an ESR message to the first network 704.

In one configuration, the UE may perform the activity via the second network at the end of a paging cycle of the first network in order to decrease the possibility of missing a page transmitted to the UE from the first network. For example, with reference to FIG. 7, the page from the first network 704 may be an LTE page that is transmitted to the UE 702 according to an LTE paging cycle. In another configuration, the UE may perform the activity via the second network immediately after the first RAT of the first network enters a low power state.

At step 814, the UE may resume communication with the first network via the first RAT using the context after the activity is performed. Therefore, by performing the activity via the second network without sending the ESR message to the first network, the UE may decrease the amount of signaling and time for resuming activity on the first network after performing the activity via the second network.

Figure 9:
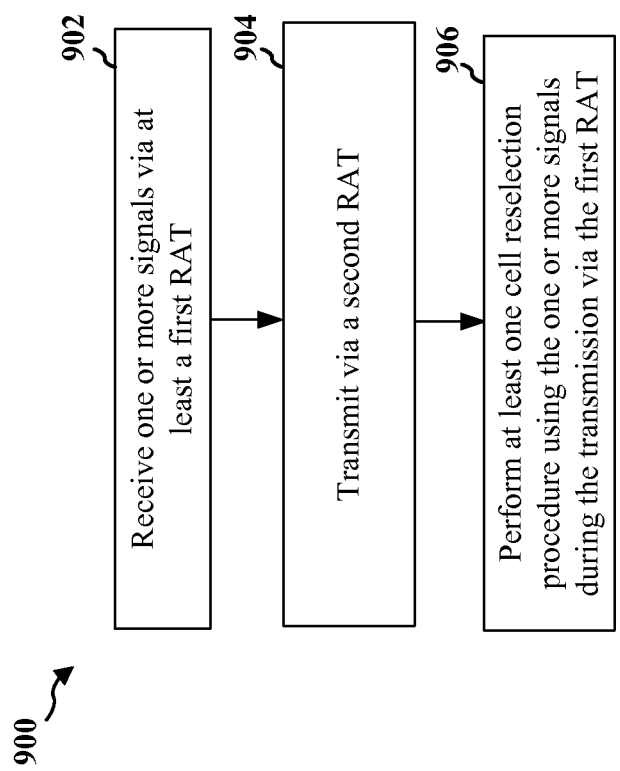
FIG. 9 is a flow chart of a method of wireless communication.

FIG. 9 is a flow chart 900 of a method of wireless communication. The method may be performed by a UE. At step 902, the UE may receive one or more signals via at least a first RAT of a first network. For example, with reference to FIG. 7, the first network may be the first network 704 and the second RAT may be LTE. In one configuration, the first RAT may be EV-DO. For example, the one or more signals may include system information update messages, such as SIB overhead messages.

At step 904, the UE may transmit via a second RAT of a second network. For example, with reference to FIG. 7, the second network may be the second network 706 and the first RAT may be 1×RTT. In one configuration, the UE may transmit via the second RAT and may concurrently receive the one or more signals via at least the first RAT of the first network. For example, the transmission by the UE via the second RAT may include a voice call transmission.

At step 906, the UE may perform at least one cell reselection procedure using the one or more signals during the transmission via the second RAT. For example, the at least one cell reselection procedure may include idle camping procedures on the first RAT and may include an intra-frequency reselection procedure, an inter-frequency reselection procedure, and/or an inter-RAT reselection procedure.

Figure 10:
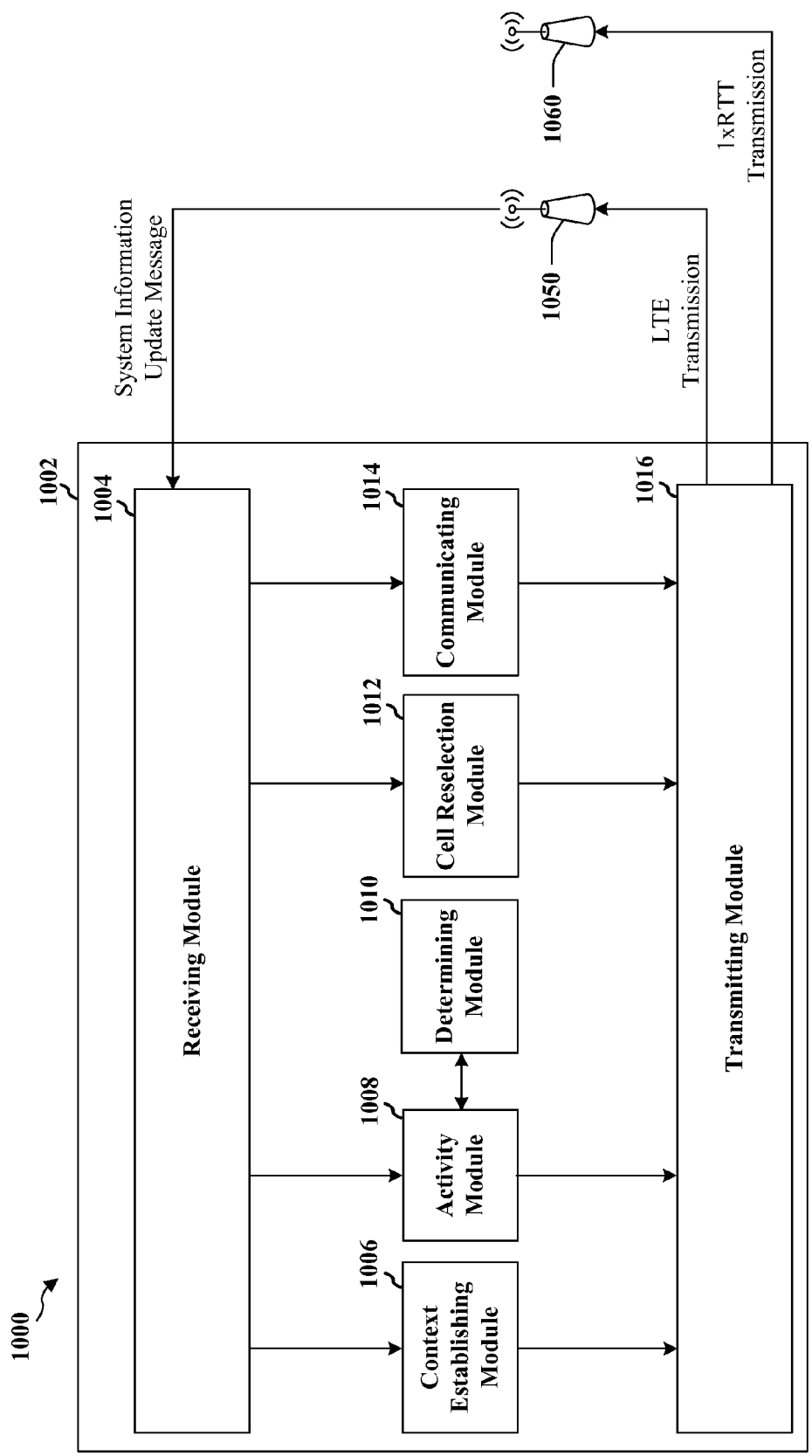
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE. The apparatus includes receiving module 1004 that receives one or more signals via at least a first RAT of a first network (e.g., eNB 1050). In one configuration, the receiving module 1004 may include at least two RF receive chains. For example, the first network may be a packet switched network and the first RAT may be LTE. For example, the one or more signals may include system information update messages.

The apparatus includes a context establishing module 1006 that establishes a context for the first RAT of the first network.

The apparatus further includes an activity module 1008 that performs an activity involving at least one transmission via a second RAT of a second network. For example, the second network may be a network configured to provide circuit switched domain services and the second RAT may be 1×RTT. For example, the activity may be a 1× registration procedure, an SMS message transmission, an MO 1×RTT voice call, or a response to an MT page with voice service option. As shown in FIG. 10, the apparatus may perform the activity by sending one or more transmissions to the 1×RTT base station 1060.

The apparatus further includes a transmitting module 1016. In one configuration, as shown in FIG. 10, the one or more transmissions to the 1×RTT base station 1060 may be sent via the transmitting module 1016. In one configuration, the transmitting module 1016 may include a single RF transmit chain.

The apparatus further includes a determining module 1010 that determines whether a duration of an activity to be performed is less than a threshold. For example, the threshold may be a period of time, such as 10.0 seconds. In one configuration, the determining module 1010 may determine the duration of the activity to be performed based on previously received information indicating the approximate duration of the activity. In another configuration, the determining module 1010 may determine the duration of the activity to be performed based on a previous performance of the activity. The determining module 1010 further determines an end of a paging cycle of the first RAT or determines when the first RAT enters a low power state. In one configuration, the determining module 1010 may communicate to the activity module 1008 to perform the activity after the end of a paging cycle of the first RAT. In another configuration, the determining module 1010 may communicate to the activity module 1008 to perform the activity when the first RAT enters a low power state.

In one configuration, if the duration of the activity to be performed is less than the threshold, the apparatus may perform the activity without initiating a procedure to suspend the context for the first RAT. For example, the apparatus may perform the activity without sending an ESR message to the first network, where the first network is configured to suspend the context in response to receiving an ESR message.

The apparatus further includes a cell reselection module 1012 that performs at least one cell reselection procedure. For example, the cell reselection procedure may include idle camping procedures on the first RAT and may include an intra-frequency reselection procedure, an inter-frequency reselection procedure, and/or an inter-RAT reselection procedure.

The apparatus further includes a communicating module 1014 that communicates with the first network (e.g., eNB 1050) via the first RAT and the second network (e.g., 1×RTT base station 1060) via the second RAT. For example, the communicating module 1014 may perform a first RAT transmission to the eNB 1050 and a second RAT transmission to the 1×RTT base station 1060. In one configuration, the first RAT transmission may be an LTE transmission, and the second RAT transmission may be a transmission associated with a 1× registration procedure, an SMS message transmission, an MO 1×RTT voice call, or a response to an MT page.

The apparatus may include additional modules that perform each of the steps of the algorithm in the aforementioned flow charts of FIGS. 8 and 9. As such, each step in the aforementioned flow charts of FIGS. 8 and 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
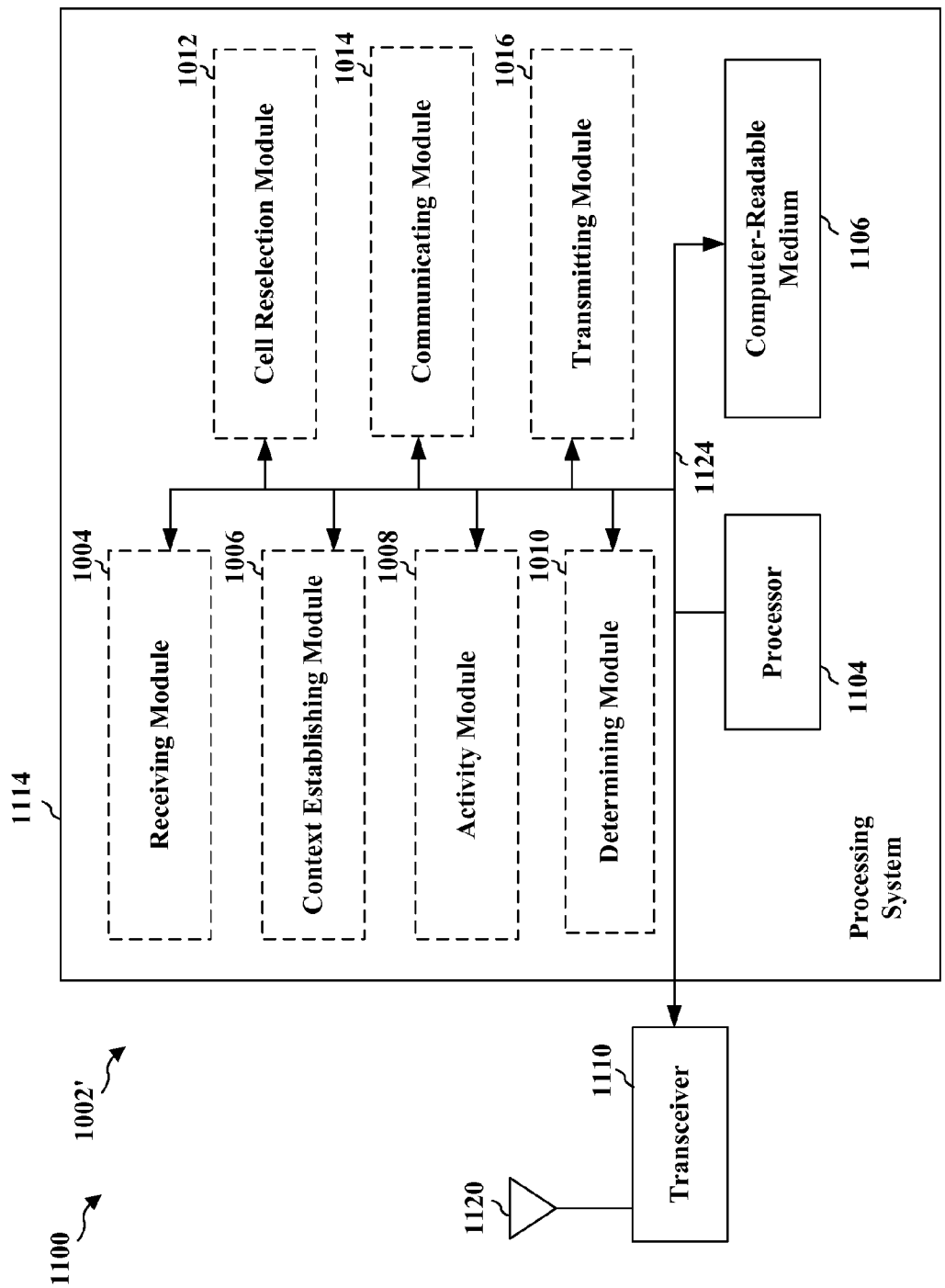
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012, 1014, and 1016, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, 1010, 1012, 1014, and 1016. The modules may be software modules running in the processor 1104, resident/stored in the computer readable medium 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for establishing a context for a first RAT, means for performing an activity involving at least one transmission via a second RAT without initiating a procedure to suspend the context for the first RAT when a duration of the activity is less than a threshold, means for communicating via the first RAT using the context after the activity is performed, means for determining the duration of the activity based on a previous performance of the activity, means for receiving one or more signals via at least a first RAT, means for transmitting via a second RAT, and means for performing at least one cell reselection procedure using the one or more signals during the transmission via the second RAT. The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, the method comprising:
performing an activity involving at least one transmission via a second radio access technology (RAT) upon a first RAT entering a low power state, without initiating a procedure to suspend an established context for the first RAT when a duration of the activity is less than a threshold; and communicating via the first RAT using the context after the activity is performed.

2. The method of claim 1, wherein the activity is a registration procedure or a transmission of a short message service (SMS) message.

3. The method of claim 1, further comprising determining the duration of the activity based on a previous performance of the activity.

4. The method of claim 1, wherein the activity involving the at least one transmission via the second RAT is performed immediately after an end of a paging cycle of the first RAT.

5. The method of claim 1, wherein the first RAT is a One Times Radio Transmission Technology (1×RTT) and the second RAT is Long Term Evolution (LTE).

6. A method of wireless communication, the method comprising:

transmitting via a second radio access technology (RAT) upon a first RAT entering a low power state, without initiating a procedure to suspend an established context for the first RAT when a duration of the transmission is less than a threshold, wherein the second RAT comprises a One Times Radio Transmission Technology (1×RTT); and performing, during the transmission via the second RAT, at least one cell reselection procedure using the one or more signals received via the at least a first RAT, wherein the at least a first RAT comprises Long Term Evolution (LTE).

7. The method of claim 6, wherein the at least one cell reselection procedure is at least one of an intra-frequency reselection procedure, an inter-frequency reselection procedure, and an inter-RAT reselection procedure.

8. The method of claim 6, wherein:

the one or more signals comprises system information update messages; and the at least one cell reselection procedure comprises idle camping procedures on the first RAT during the transmission via the second RAT.

9. The method of claim 6, wherein the second RAT comprises a One Times Radio Transmission Technology (1×RTT) and the at least a first RAT further comprises Long Term Evolution (LTE) and Evolution-Data Optimized (EV-DO).

10. An apparatus for wireless communication, comprising:

means for performing an activity involving at least one transmission via a second radio access technology (RAT) upon a first RAT entering a low power state, without initiating a procedure to suspend an established context for the first RAT when a duration of the activity is less than a threshold; and means for communicating via the first RAT using the context after the activity is performed.

11. The apparatus of claim 10, wherein the activity is a registration procedure or a transmission of a short message service (SMS) message.

12. The apparatus of claim 10, further comprising means for determining the duration of the activity based on a previous performance of the activity.

13. The apparatus of claim 10, wherein the activity involving the at least one transmission via the second RAT is performed immediately after an end of a paging cycle of the first RAT.

14. The apparatus of claim 10, wherein the first RAT is a One Times Radio Transmission Technology (1×RTT) and the second RAT is Long Term Evolution (LTE).

15. An apparatus for wireless communication, comprising:

means for transmitting via a second radio access technology (RAT) upon a first RAT entering a low power state, without initiating a procedure to suspend an established context for the first RAT when a duration of the transmission is less than a threshold, wherein the second RAT comprises a One Times Radio Transmission Technology (1×RTT); and means for performing, during the transmission via the second RAT, at least one cell reselection procedure using the one or more signals received via the at least a first RAT, wherein the at least a first RAT comprises Long Term Evolution (LTE).

16. The apparatus of claim 15, wherein the at least one cell reselection procedure is at least one of an intra-frequency reselection procedure, an inter-frequency reselection procedure, and an inter-RAT reselection procedure.

17. The apparatus of claim 15, wherein:

the one or more signals comprises system information update messages; and the at least one cell reselection procedure comprises idle camping procedures on the first RAT during the transmission via the second RAT.

18. The apparatus of claim 15, wherein the second RAT comprises a One Times Radio Transmission Technology (1×RTT) and the at least a first RAT further comprises Long Term Evolution (LTE) and Evolution-Data Optimized (EV-DO).

19. An apparatus for wireless communication, comprising:

a processing system configured to:

perform an activity involving at least one transmission via a second radio access technology (RAT) upon a first RAT entering a low power state, without initiating a procedure to suspend an established context for the first RAT when a duration of the activity is less than a threshold; and communicate via the first RAT using the context after the activity is performed.

20. The apparatus of claim 19, wherein the activity is a registration procedure or a transmission of a short message service (SMS) message.

21. The apparatus of claim 19, wherein the processing system is further configured to determine the duration of the activity based on a previous performance of the activity.

22. The apparatus of claim 19, wherein the activity involving the at least one transmission via the second RAT is performed immediately after an end of a paging cycle of the first RAT.

23. The apparatus of claim 19, wherein the first RAT is a One Times Radio Transmission Technology (1×RTT) and the second RAT is Long Term Evolution (LTE).

24. An apparatus for wireless communication, comprising:

a processing system configured to:

transmit via a second radio access technology (RAT) upon a first RAT entering a low power state, without initiating a procedure to suspend an established context for the first RAT when a duration of the transmission is less than a threshold, wherein the second RAT comprises a One Times Radio Transmission Technology (1×RTT); and perform, during the transmission via the second RAT, at least one cell reselection procedure using the one or more signals received via the at least a first RAT, wherein the at least a first RAT comprises Long Term Evolution (LTE).

25. The apparatus of claim 24, wherein the at least one cell reselection procedure is at least one of an intra-frequency reselection procedure, an inter-frequency reselection procedure, and an inter-RAT reselection procedure.

26. The apparatus of claim 24, wherein:
the one or more signals comprise system information update messages; and
the at least one cell reselection procedure comprises idle camping procedures on the first RAT during the transmission via the second RAT.

27. The apparatus of claim 24, wherein the second RAT comprises a One Times Radio Transmission Technology (1×RTT) and the at least a first RAT further comprises Long Term Evolution (LTE) and Evolution-Data Optimized (EV-DO).

28. A computer program product, comprising:
a non-transitory computer-readable medium comprising code for:
performing an activity involving at least one transmission via a second radio access technology (RAT) upon a first RAT entering a low power state, without initiating a procedure to suspend the context for the first RAT when a duration of the activity is less than a threshold; and
communicating via the first RAT using the context after the activity is performed.

29. The computer program product of claim 28, wherein the activity is a registration procedure or a transmission of a short message service (SMS) message.

30. The computer program product of claim 28, wherein the non-transitory computer-readable medium further comprises code for determining the duration of the activity based on a previous performance of the activity.

31. The computer program product of claim 28, wherein the activity involving the at least one transmission via the second RAT is performed immediately after an end of a paging cycle of the first RAT.

32. The computer program product of claim 28, wherein the first RAT is a One Times Radio Transmission Technology (1×RTT) and the second RAT is Long Term Evolution (LTE).

33. A computer program product, comprising:
a non-transitory computer-readable medium comprising code for:
transmitting via a second RAT upon first radio access technology (RAT) entering a low power state, without initiating a procedure to suspend an established context for the first RAT when a duration of the transmission is less than a threshold, wherein the second RAT comprises a One Times Radio Transmission Technology (1×RTT); and
performing, during the transmission via the second RAT, at least one cell reselection procedure using the one or more signals received via the at least a first RAT, wherein the at least a first RAT comprises Long Term Evolution (LTE).

34. The computer program product of claim 33, wherein the at least one cell reselection procedure is at least one of an intra-frequency reselection procedure, an inter-frequency reselection procedure, and an inter-RAT reselection procedure.

35. The computer program product of claim 33, wherein:
the one or more signals comprises system information update messages; and
the at least one cell reselection procedure comprises idle camping procedures on the first RAT during the transmission via the second RAT.

36. The computer program product of claim 33, wherein the second RAT comprises a One Times Radio Transmission Technology (1×RTT) and the at least a first RAT further comprises Long Term Evolution (LTE) and Evolution-Data Optimized (EV-DO).

* * * * *